United States Patent [19]

Stansbury, Jr.

[11] 4,264,216

[45] Apr. 28, 1981

[54] APPARATUS AND METHOD FOR BEATING AN EGG WITHIN ITS OWN SHELL

[75] Inventor: Benjamin H. Stansbury, Jr., Beverly Hills, Calif.

[73] Assignee: Ronco Teleproducts, Inc., Elk Grove Village, Ill.

[21] Appl. No.: 40,717

[22] Filed: May 21, 1979

[51] Int. Cl.³ .................................................. B01F 7/16
[52] U.S. Cl. ...................................... 366/343; 99/348; 99/646 R; 366/205
[58] Field of Search ............... 366/349, 129, 130, 197, 366/206, 205, 601, 343; 99/348, 646 R, 485; 416/31, 202

[56] References Cited

U.S. PATENT DOCUMENTS

| | | | |
|---|---|---|---|
| 2,224,941 | 12/1940 | Weimer | 99/646 R |
| 2,760,763 | 8/1956 | Harper | 99/485 |
| 2,822,009 | 2/1958 | Haus | 99/485 |
| 3,357,685 | 12/1967 | Stephens | 99/348 |
| 3,796,512 | 3/1974 | Djuvik | 416/202 |

*Primary Examiner*—Robert W. Jenkins
*Attorney, Agent, or Firm*—Romney, Schaap, Golant, Disner & Ashen

[57] ABSTRACT

A relatively low-power egg beating device for scrambling an egg within its shell. The device includes an improved smoothly curved axially offset needle which is rotated by a motor. The configuration of the needle permits effective beating at relatively low RPMs. The motor is normally off, and in addition, a brake limits rotation of the axially offset needle to facilitate the user grasping the egg shell and impaling it upon the needle. As the egg is fully impaled on the needle, the shell engages and moves a control member which automatically turns on the motor and releases the brake. As the user holds the shell, the needle rotates to beat the egg within the shell. When the user then begins to withdraw the egg shell from the needle, the shell disengages from the control member which automatically turns the motor off and reengages the brake. This permits ready removal of the egg from the stopped needle. Because of its low power requirements the device may be battery powered, fully self-contained and portable. A cup-shaped element may be provided around the needle to facilitate the proper positioning and holding of the egg by the user through the scrambling operation and to contain the egg if the shell should break open. A sealing membrane may be provided to separate the area around the needle where the egg is disposed from the motor; in a preferred form, the sealing membrane is at least partially movable to accomodate movement of adjacent parts of the device.

20 Claims, 6 Drawing Figures

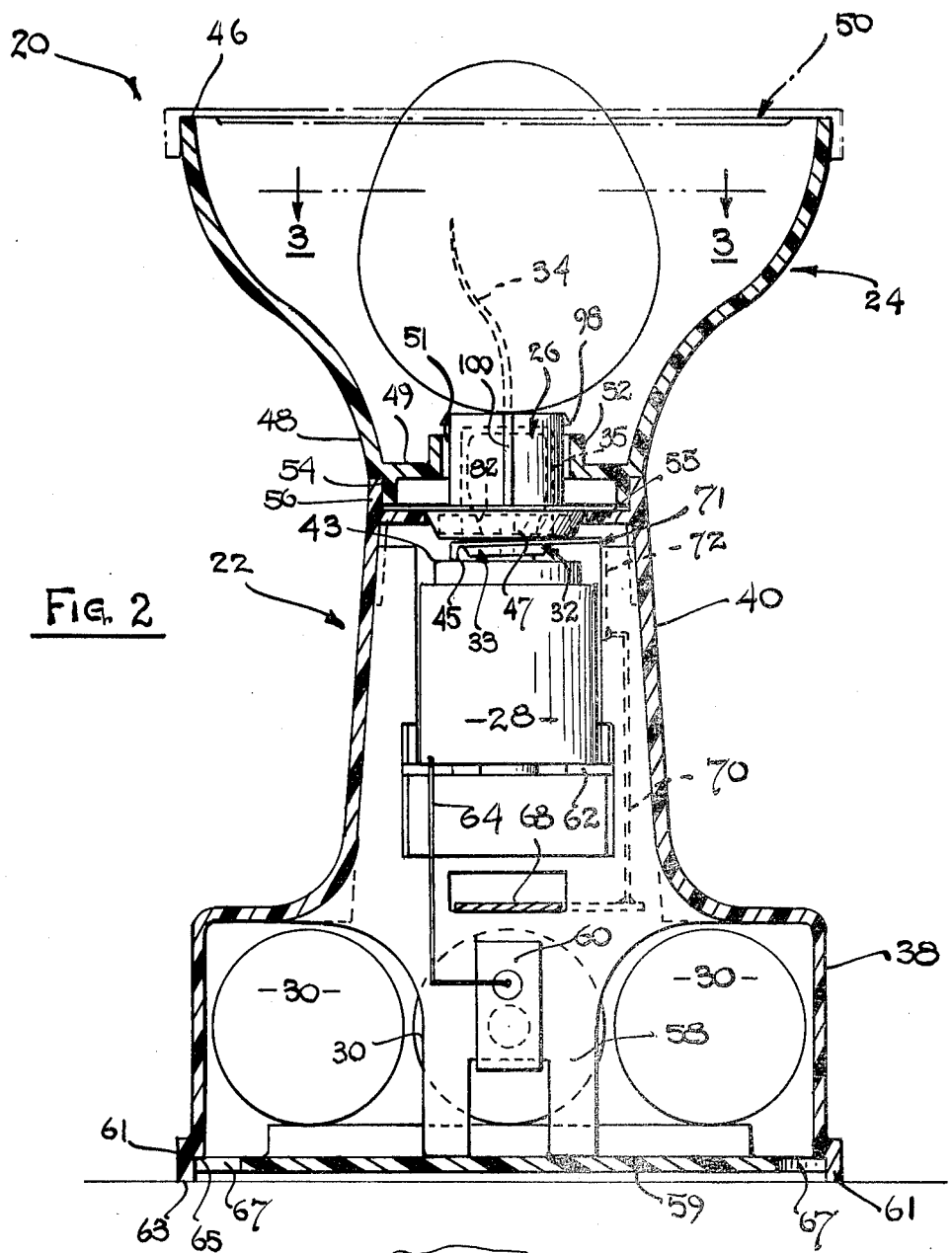
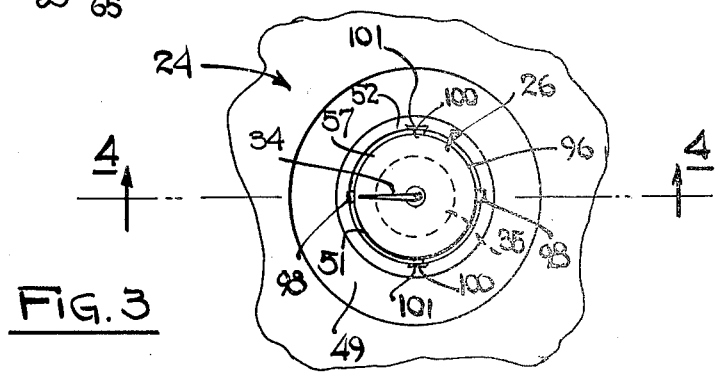

APPARATUS AND METHOD FOR BEATING AN EGG WITHIN ITS OWN SHELL

BACKGROUND OF THE INVENTION

The invention relates generally to an egg beating device and more specifically to a low-power device for scrambling an egg within its shell.

A review of the prior art discloses several devices designed to beat the contents of an egg within its own shell, including: U.S. Pat. No. 3,796,512 issued Mar. 12, 1974 to Djuvick; U.S. Pat. No. 2,760,763, issued Aug. 28, 1956 to Harper, and U.S. Pat. No. 2,316,861 issued Apr. 30, 1943 to Hansen.

Prior art devices for this purpose tended to be relatively heavy, cumbersome and complicated. They usually required substantial power and therefore were designed to plug into wall sockets so they could impart rotation of 2800 or more RPMs to the beater. The beater designs were not as efficient as desired. Further, while devices such as shown in Hansen U.S. Pat. No. 2,316,861 automatically turned the motor on and off, they did not limit rotation of the needle when the motor was off so that particular care had to be exercised when placing the egg on and removing it from the beater needle. Also, if the needle was off center, this promoted the beating action, but made it more difficult to impale the egg shell on the readily movable, eccentric needle point.

Further, in various prior art designs the orientation and/or configuration makes it difficult to handle the egg through all or part of scrambling operation. Apparently to avoid having to deal with egg leaking down into the motor or other mechanism of the device, the prior art devices noted above were arranged in unnatural orientations, e.g., with the needle pointing downwardly or off to the side.

SUMMARY OF THE DISCLOSURE

The illustrated device obviates a number of the deficiencies of the prior art. The efficient beater design provides adequate beating action at relatively low RPMs so that less powerful power supplies such as disposable batteries can be used; this in turn permits the unit to be self-contained and fully portable. The beater design also facilitates easy impaling of the egg shell as well as coverage of essentially all of the interior of the shell. Another important feature is the provision of a fully automatic brake, which in combination with a fully automatic off-on switch for the motor makes the device simple and easy to use and elminates the chance for the most common errors in operating such a device, i.e., cracking the shell at the start because of difficulty in impaling the shell on a beater needle that will not stay still, or breaking open the shell by trying to remove the shell while the beater needle is still rotating. The cup structure surrounding the beater is proportioned and configured not only to permit the user to adequately hold the egg during the entire scrambling operation, but to provide support of the user's hand. A simple, but adequate, seal memberane separates the area where the egg is scrambled from the motor and other mechanism; this permits the needle to be positioned in a natural upright orientation. Further, in the preferred form of the device, the sealing membrane is at least partially movable to accomodate movement of components of the device.

It is a primary object of the present invention to provide a device for effectively beating an egg within its own shell with a needle that is rotated at a relatively low speed and therefore requires relatively low power input.

It is a further object to provide such a device which is battery operated and thus fully self-contained and portable.

It is yet a further objective to provide a device for beating an egg in its own shell where the placement of the egg on the device and its removal automatically turn a drive motor on and off and also operate a brake which limits rotation of a beater needle when the egg is being placed on and when it is being removed from the needle.

It is another object to provide a simple, effective and efficient needle configuration for such a device.

It is another object to provide such a device with a container adjacent to the needle to afford the user's hand support as well as access to an egg on the device.

It is another object to provide such a device with a flexible membrane seal for separating the egg beating area from the motor and related parts.

DESCRIPTION OF THE DRAWINGS

In the drawings:

FIG. 2 is an enlarged side cross-sectional view of the device, showing the control button depressed to turn on the motor and release the brake.

FIG. 3 is a fragmentary, top view of the device taken generally along line 3—3 of FIG. 2.

DESCRIPTION OF THE ILLUSTRATED DEVICE

Figure 1:
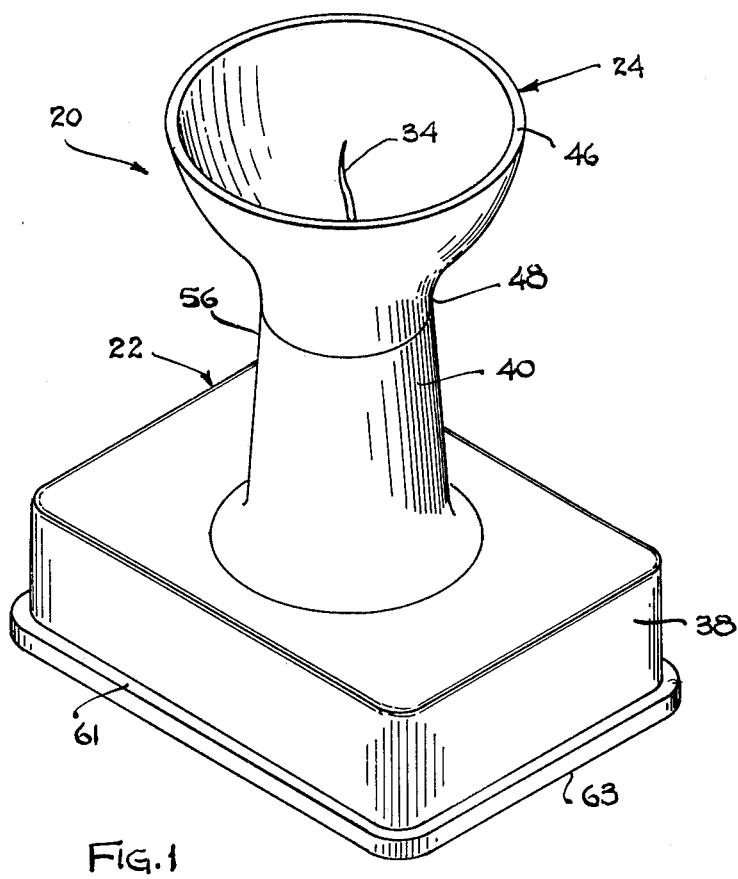
FIG. 1 is a isometric view of a presently preferred embodiment of an egg beater device in accordance with the present invention.

In general, the illustrated egg beater 20 comprises a housing 22, which contains power means in the form of a motor 28 and batteries 30. The motor rotates elongated beater means in the form of a smoothly curved axially offset needle 34 which estends upwardly from the top of the housing. A cup shaped container 24 is mounted on the top of the housing around the needle 34. A brake means 32 normally limits rotation of the needle while the user is positioning an egg on the needle.

A slidable control member or button 26 is disposed at the base of the needle so that the button 26 is depressed downwardly when an egg is sufficiently impaled on the needle. This downward movement of the control member 26 automatically engages electrical switch means 33 to immediately turn the motor on, and also automatically and immediately disengages the brake means 32 so that the needle can rotate freely and beat the contents of the egg. When the egg shell is subsequently lifted off the control button 26, it automatically rises, thereby immediately causing the electrical switch means 33 to disengage to turn the motor off, and also immediately causing the brake means 32 to again limit rotation of the needle so that the shell can be removed from the needle with minimum damage to the shell.

Figure 4:
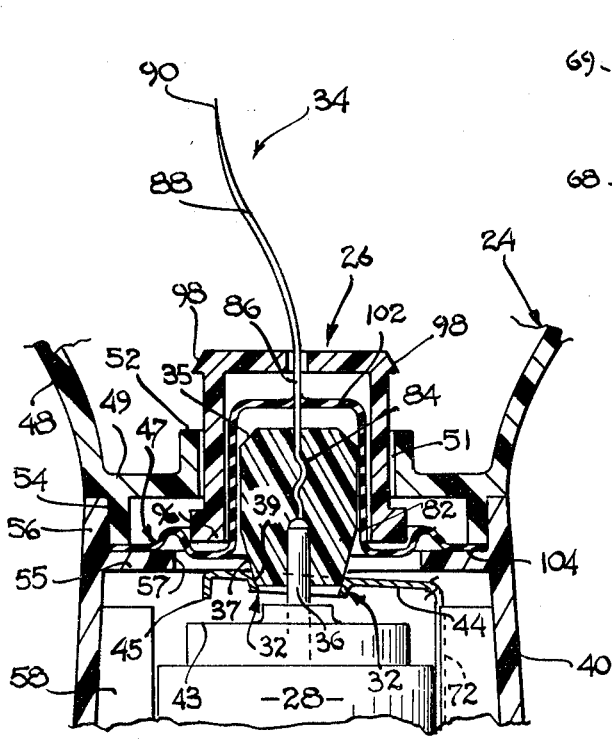
FIG. 4 is a further enlarged fragmentary, side cross-sectional view of the device taken generally along lines 4—4 of FIG. 3, showing the control button released to turn the motor off and engage the brake.

In the illustrated device 20 a ferrule 35 secures the needle 34 to the motor 28, and also provides a high-friction frusto-conical first brake surface 37 for the brake means 32. The other or second brake surface 39 is provided by a mating annular rim of an elongate hole 42 in a movable arm 44. The arm 44 also provides one of the electrical contacts 45 for the electrical off-on switch 33. The arm 44 is biased upwardly as shown in FIG. 4 to bring the brake surfaces 37 and 39 into engagement and to open the switch 33. Downward movement of the control button 26 forces the arm 44 downwardly, as shown in FIG. 2, to disengage the annular brake surface 39 from the fursto-concial brake surface 37, and also to touch the arm against the hot chassis of the motor to thereby close the electrical motor switch 33. A sealing diaphragm 47 extends across the upper end of the housing to effectively separate the egg scrambling area from the motor and related parts. The sealing diaphragm 47 is configured and arranged to have a portion move with the movable control button 26 incident to operation of the device.

Referring now to the drawings in more detail, the external structure of the egg beater 20 comprises two parts: the hollow housing 22 which comprises a lower generally rectangular base section 38 and an upwardly exending generally cylindrical mid-section 40; and the cup-shaped container 24 which is mounted on top of the housing mid-section 40. The housing and container may be made of any suitable material, as for example molded plastic such as styrene.

The device is described in the illustrated orientation with the axes of the needle and the motor vertical. This is a convenient and useful arrangement. It would be possible if desired to tilt the axes or to arrange them in other orientations such as generally horizontal. The container 24 is circular in horizontal cross-section and coaxial with the housing mid-section 40. Its upper edge 46 has the largest diameter, it then progressively narrows to smaller diameters toward its lower end 48. As seen best in FIG. 2, it has a larger upper interior area, a converging intermediate interior area, and an almost cylindrical lower interior area. When the egg shell is fully impaled on the needle it occupies the intermediate and upper areas and normally extends above the container upper edge 46 as shown in FIG. 2. It will be noted that this interior shape of the container facilitates the user grasping the egg shell to impale it on and to remove it from the needle, and also to hold it while the egg is being scrambled. There is room for the user's fingers to encircle and support the egg shell, while the fingers can rest against and be supported by the interior of the container at the intermediate area. As shown in FIGS. 2, 3 and 4, the lower end 48 of the container 24 has a transverse circular bottom wall 49 with a generally circular opening 51. There is an upstanding peripheral lip or wall 52 around the edge of the opening 51. The control member in the form of the button 26 is coaxially received in the opening 51 for vertical sliding movement.

For attachment to the housing, the lower end 48 of the container has a circular lip or wall 54 which depends from the underside of the bottom wall 49. The lip 54 is smaller in diameter than the lower end 48 of the container side wall so that the lip 54 can be received into the open upper end of the housing cylindrical mid-section 40.

A suitable cover such as the circular snap-on cover 50 shown in broken line in FIG. 2 may be provided to close the upper end 46 of the container when the device is not being used. This prevents dirt or other foreign material from getting into the container and also provides a safety shield over the pointed needle 34.

The housing mid-section 40 is generally a hollow cylinder open at its upper end 56. As noted above, the depending circular wall 54 at the lower end of the container is received in that end 56. The housing mid-section 40 has a transverse upper wall 55 with a circular central opening 57 large enough for the control button 26 to pass through.

The illustrated housing 22 contains and supports the motor 28, the batteries 30, and electrical circuit means. The electrical circuit means comprise electrical conductors that electrically connect the motor to the batteries and the electrical switch means 33. The housing also contains the brake means 32 and receives the lower end of the control button 26 for operating the brake and switch means.

In general, the batteries 30 are contained in the lower base section 38, and the motor 28 is supported coaxially within the upper portion of the mid-section 40 (see FIG. 2).

Figure 6:
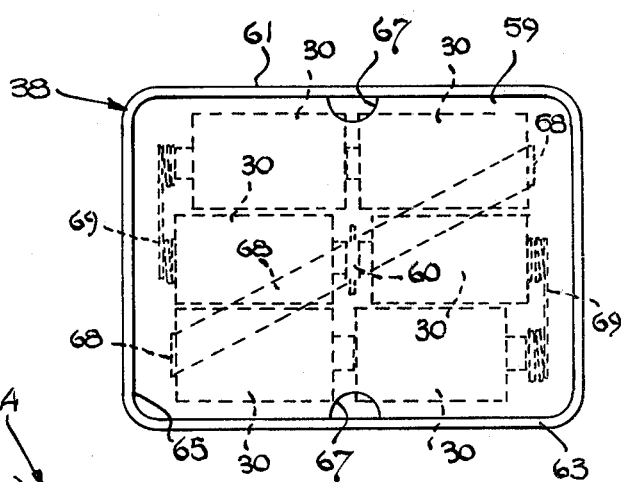
FIG. 6 is a bottom view of the device.

More particularly, six batteries (1.5 volts each) are disposed in the base section 38 as shown in FIGS. 2 and 6. The base 38 has a rectangular bottom cover 59 which snap fits within a mating rectangular opening defined by the lower edge 63 of the base section 38. The edge 63 forms a rectangular groove or receptacle 65 for the edge of the cover 59. Projections 61 releasably hold the cover 59 in place. The cover 59 is thus slightly elevated above the supporting surface by the rectangular base section lower edge 63. The bottom cover 59 has two small holes 67 cut in the form of half circles at the middle of two of its peripheral edges for allowing it to be removed, when necessary, as by using any suitable pointed article as a lever. The cover 59 partially supports the batteries 30. Additional support for the batteries 30 is provided within the base 38 as seen best in FIG. 6, by two sets of battery holding coil springs 69, mounted within the base 38, and by a contact strip 68, which will be further described and which, mounted diagonally within the base 38, has its two opposed ends bent over at right angles and shaped in a corrugated fashion for providing further compressive support for the batteries 30.

Figure 5:
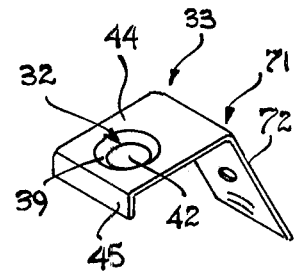
FIG. 5 is a perspective view of the brakeswitch conductor strip in its preassembly configuration.

The motor 28 is mounted in the upper portion of the mid-section on a horizontal platform 62 of a support frame 58 which is disposed within housing 22. In general, the motor is electrically connected to the batteries, by electrical circuit means that include the switch means 33. In this connection, the motor 28 is connected through a wire conductor 64 to a first conductor strip 60. The strip 60 is in electrical contact with the batteries 30. The batteries are also in electrical contact with a second conductor strip 68 which is connected by a second wire conductor 70 to an L-shaped conductor strip 71. The strip 71 has a vertically extending arm 72 which is integrally formed with the generally horizontal extending arm 44. The contact 45 is formed by the downwardly bent end of the arm 44. The vertical arm 72 is secured to the frame 58. The strip 71 is made of an electrically conductive resilient material such as copper formed to the configuration illustrated in FIG. 5 where the arm 44 extends at about a 60–75 degree angle from the arm 72. When the strip 71 is assembled in the device with the arm 72 vertical, the arm 44 is flexed somewhat downwardly to the position shown in FIG. 4 (about 50-60 degress from arm 72) as determined by the engagement of the annular brake surface 39 with the frusto-conical brake surface 37. Thus, there is spring tension between the brake surfaces 37-39. The electrical contact 45 of the switch 33 is out of engagement with the hot chassis of the motor. When the button 26 is depressed, the arm 44 is further flexed downwardly to disengage the brake surfaces 37, 39 and cause switch contact 45 to contact the motor chassis to close the switch and the circuit.

The motor 28, as shown in FIG. 4, has an upwardly protruding rotary shaft 36 upon which is fixedly attached egg beater needle 34 by means of a generally cylindrical ferrule 35. The illustrated ferrule 35 is preferrably made of a material such as a urethane elastomer which is resilient for firmly attaching to other parts and also provides a good brake material. The lower end of the ferrule 35 is press fit onto the upper end of the motor shaft 36 and the lower end 84 of the needle is press fit into the upper end of the ferrule 35. The lower end of the needle is reverse bent or rippled and the receiving hole in the ferrule is straight to firmly imbed the needle in the ferrule; this limits the needle pulling out or rotating relative to the ferrule. The illustrated ferrule 35 has the frusto-conically shaped first braking surface 37 at its lower end. The braking surface 37 terminates at its upper end at an annular shoulder 82. As noted above, the first braking surface 37 is normally engaged with the braking surface 39 of the arm 44.

The smooth contoured needle 34 is composed of four portions: the first or lower needle portion 84 described above which is imbedded in the ferrule 35, and the remaining three portions which are exposed and extend in a generally upward, longitudinal direction in a unique curved shape, the overall length being sufficient to penetrate an egg shell for a substantial distance. The concept of a curved needle is not new in the art, but the shape of this "S shaped" curved needle 34 is particularly adapted to enter an egg shell and efficiently whip the contents thereof so as to allow the use of a low power motor 28, specifically a motor 28 which can be powered by batteries. A second needle portion 86 above the twisted first needle portion 84, is essentially straight and generally follows a first longitudinal axis which is coaxial with the motor shaft axis; a third needle portion 88, above the straight second portion 86, is bent in a smooth curve to extend at about a 25 degree angle from the vertical and comprises about 40% of the total needle length; and lastly, a fourth, upper, pointed needle portion 90 which is bent back in a smooth curve to extend essentially in a vertical, second longitudinal axis, parallel to but offset from that of the second needle portion 86. The needle portion 90 terminates in a shape pointed end.

Thus, the motor shaft, ferrule and beater needle are generally coaxial and rotate about a common vertical axis.

The ferrule 35, and the needle 34 extend upwardly through the circular opening 57 in the top wall of the housing's mid-section 40 and also pass through the central opening 51 in the container bottom wall. The needle extends up into the container 24. The cylindrical depressible control button 26 is disposed around the ferrule and the lower portions of the needle. The needle 34 protrudes upwardly through a small centrally located hole in the upper, circular end of the button 26. The button 26 extends downwardly through the central opening 51 in the container bottom wall and through the opening 57 in the housing mid-section top wall 55.

In general, the button 26 slides up and down. It is normally biased upwardly to the position shown in FIG. 4 by the arm 44. At such time the arm 44 is also engaging the ferrule 35 to limit rotation of the needle. When the button 26 is depressed downwardly, it depresses the arm 44 to disengage the arm 44 from the ferrule 35 to permit free rotation of the needle 34 and to turn on the motor. More particularly, the button 26 has an outwardly extending lip 96 circling its bottom end which is slightly larger in circumference than the button's general circumference. The button also has a pair of opposed, outwardly extending tabs 98 located at its upper end (see FIGS. 2 and 3). The button lip 96 is designed to limit upward travel of the button, and the two tabs 98 are intended to limit downward travel In addition, the button 26 has means to limit its rotation while permitting its axial movement. In this regard, as shown best in FIG. 3, the button 26 has a pair of external ribs 100 which are 180 degrees opposed to each other and which are offset 90 degrees each from the tabs 98. The ribs 100 run axially along the outer periphery of the button 26 from the lower lip 96 to its upper end. The ribs 100 are received in mating channels 102 in the periphery of the circular opening 51 in the bottom wall 49 of the container 24.

The flexible sealing diaphragm 47 extends across the device above the motor 28. As shown in FIG. 4, the sealing diaphragm 47 includes an upper cylindrical portion 102 disposed within the button 26 and around the ferrule 35. The cylindrical portion 102 is closed at its upper end except for a small hole through which the needle passes. The cylindrical portion 102 is open at its lower end where it integrally connects to a horizontally disposed outwardly extending disc portion 104. The outer edge of the disc portion 104 is clamped in place between the lower edge of the circular container wall 54 and the adjacent upper surface of the housing mid-section top wall 55. The disc portion has a circular ridge or ripple about half the distance from its outer edge to permit the seal to move and expand in the axial direction when the button 26 is depressed as shown in FIG. 2.

Having described the parts of the illustrated egg beater 20, reference is now made to its operation. First the unit is generally placed on a flat surface and the cover 50 is removed. Then, a user holding an egg with the fingers of one hand, generally around the egg's shell, lowers the egg into the ara defined by the container 24 and places the egg over and onto the needle 34, causing the needle pointed top portion 90 to pierce the shell of the egg at any point generally near the bottom end of the egg. The user may use the fingers of his or her other hand to grasp the housing. Until the needle 34 is very nearly fully immersed in the egg, the motor 28 will remain in its off-mode and the brake means 32 will be engaged; i.e., the arm 44 in its upper position where annular brake surface 39 frictionally engages brake surface 37 of the ferrule 35, thus limiting rotation of the ferrule 35 and the needle 34 to facilitate piercing the egg shell and to prevent premature needle rotation which might unduly enlarge the hole pierced in the bottom of the egg. Once the egg is fully depressed within the container 24 so that the needle 34 is fully immersed in the egg shell, and the shell has engaged the button 26, additional downward pressure on the egg shell automatically moves the vertically slidable button 26 downward. As shown in FIG. 2, this downward button movement pushes the arm 44 downward to disengage surface 39 away from engagement with the ferrule surface 37. The ferrule 35 and needle are now free to rotate. Simultaneously, the arm 44, when pressed downwardly, moves the elecrical contact 45 into direct contact with the hot chassis of the motor 28, thus closing switch 33 and turning on the motor 28.

Turning the motor 28 on causes rotation of the motor's rotary shaft 36, thereby causing rotation of the ferrule 35 and the attached needle 34. The needle 34 with its curved shape and now being fully immersed in the egg shell, revolves within the egg shell, following a convoluted path, and thoroughly beats the contents of the shell. Generally, five or six seconds of such egg beating action at about 1400 RPMs is sufficient to properly scramble the contents of the egg shell.

Removing the egg from the egg beater 20, the user begins lifting the egg shell upwardly off of the needle 34. As soon as lifting begins, the depressed, slidable button 26 is automatically allowed to move upwardly, relieved of the previous downward egg shell pressure and pushed upwardly by the spring action of the switch/brake arm 44. As the seitch/brake arm 44 moves upwardly it breaks contact with and thus turns the motor 28 off. The annular brake surface 39 also engages the brake surface 37 of the ferrule 35 to inhibit further rotation of the needle 34. This acts to prevent the needle 34 from continuing to rotate and possible enlarge the hole in the egg shell before the egg shell is completely lifted off of the needle 34. Thus, the arm 44 serves functionally as both an electrical switch and as a brake. This design feature provides both the desired operation and reduces the number of parts. The illustrated device provides automatic operation in that it does not require the user to perform any operations other than manipulation of the egg.

The illustrated egg beater 20 is portable for easy use, transportation and storage. A plug-in power source is not needed. Adequate power may be provided by low cost replaceable batteries since the beater needle will operate effectively at relatively low RPMs.

Thus, there has been illustrated and described a unique and novel egg beating device which fulfills the objects and advantages sought therefore. It should be understood that changes, modifications and/or other applications will become apparent to those skilled in the art after considering this specification and the accompanying drawings. Therefore, any and all such changes, modifications and/or other applications which do not depart from the spirit and scope of the invention are deemed to be covered by the invention, limited only by the following claims.

What is claimed is:

1. Apparatus for beating an egg within its own shell, comprising:
   (a) base means;
   (b) a motor mounted on said base means and having a rotary output shaft;
   (c) elongated beater means having a generally longitudinal axis and being mounted on said base means for rotation about said axis, said beater means having a point at one end for piercing the shell of an egg and permitting the beater means to be positioned extending into the interior of the shell, said beater means being connected to said motor output shaft for rotation by said shaft;
   (d) brake means on said base means for limiting the rotation of said beater means to facilitate piercing the shell and positioning of said beater means into said shell and subsequent removal of said beater means from said position in said shell after the egg has been beaten;
   (e) switch means connected to said motor for turning said motor, on and off; and
   (f) control means operatively associated with said brake means and said switch means, and having a movable member disposed for engagement and movement in a first direction by the shell of an egg when the shell has been moved so that said beater means is substantially fully positioned within the shell, said movement of said movable member causing said switch means to turn on said motor and causing said brake means to not limit the rotation of said beater means, said movable member being movable in a second direction when the shell is moved away from it generally in said second direction to cause said switch means to turn off said motor and to cause said brake means to limit the rotation of said beater means.

2. Apparatus as called for in claim 1 wherein said motor output shaft and said elongated beater means are generally coaxial.

3. Apparatus as called for in claim 2 wherein said output shaft and said beater means are interconnected by means of a plastic ferrule element.

4. The apparatus of claim 3 wherein said plastic ferrule element is made of a urethane elastomer.

5. The apparatus of claim 3 wherein said ferrule element has a pair of opposed end portions, one end of said elongated beater means being held in one of said ferrule end portions and one end of said motor output shaft being held in the other end of said ferrule end portions.

6. The apparatus of claim 2 wherein said output shaft of said motor and said elongated beater means are disposed with their axes generally vertical.

7. The apparatus of claim 1 wherein an annular container portion is disposed around said elongated beater means and supported on said base means.

8. The apparatus of claim 7 wherein said container portion is proportioned to both receive and support the hand of a user holding an egg shell disposed on said elongated beater means to facilitate placement and removal of the egg shell as well as holding of the egg shell while said beater means is rotating.

9. The apparatus of claim 1 wherein said movable member of said control means comprises a depressable button disposed around the lower portion of said beater means and movable axially with regard to the axis of said beater means.

10. The apparatus of claim 9 further including a movably mounted arm disposed to be moved by the movement of said control button so that when said button is depressed said arm is moved out of engagement with a mating braking surface and into contact with a mating electrical contact member of said switch means.

11. The apparatus of claim 10 wherein said mating braking surface is provided by a ferrule element secured to said beater means.

12. The apparatus of claim 11 wherein said mating braking surface of said ferrule element is a frusto conical surface and the braking surface of said arm is an annular braking surface.

13. The apparatus of claim 10 wherein said arm is intergally formed with a support section disposed at generally right angles to said arm, said arm and support section being comprised of an electrically conductive material.

14. The apparatus of claim 9 further including a flexible membrane in the form of a diaphram and having a shiftable intermediate annular portion adjacent the lower edge of said button of said control means for movement with said button while maintaining a seal between said motor and the area where said egg shell is disposed.

15. The apparatus of claim 1 wherein said base means includes housing means which encloses said motor, said brake means, said switch means, and means for supporting batteries to power said motor.

16. An apparatus as called for in claim 1 wherein said beater means comprises a smoothly curved needle having a base portion generally aligned with the axis of rotation, an intermediate curve portion inclined outwardly from the axis of rotation, and an outer end portion extending generally parallel to the axis of rotation and spaced outwardly therefrom.

17. Method for beating an egg within its own shell, comprising the steps of:
(a) providing an elongated beater needle rotatable about a longitudinal axis, the needle having a pointed end offset from said axis;
(b) braking the needle while an egg shell is initially impaled upon the needle by selectively engaging said needle;
(c) releasing the engagement of the needle when the egg shell has been impaled a sufficient predetermined amount on the needle;
(d) then causing the beater needle to rotate rapidly to beat the contents of the egg shell;
(e) beginning to withdraw the shell from the beater needle;
(f) ceasing to cause rotation of the needle when the egg shell is partially withdrawn from the needle so that it is no longer impaled on said needle said predetermined amount; and
(g) again braking the needle by selectively engaging said needle when the egg shell is partially withdrawn from the needle so that it is no longer impaled on said needle said predetermined amount so that the egg shell can be completely removed from the needle without damaging the shell.

18. Apparatus for beating an egg within its own shell comprising,
a housing;
means mounted to said housing for piercing the shell of an egg;
means for causing said piercing means to rotate; and
means for selectively engaging said piercing means to prevent said piercing means from rotating when said piercing means enters and exits said egg.

19. An apparatus as claimed in claim 18 wherein said piercing means includes an elongated needle mounted in a ferrule having a breaking surface; and said rotation causing means is a motor; and including means for activating said motor and for engaging said braking surface when said motors is in an off condition.

20. An apparatus as claimed in claim 19 wherein said activating means includes a braking surface mateable with said braking surface of said ferrule.

* * * * *